(12) United States Patent
Merchant et al.

(10) Patent No.: US 7,219,349 B2
(45) Date of Patent: *May 15, 2007

(54) MULTI-THREADING TECHNIQUES FOR A PROCESSOR UTILIZING A REPLAY QUEUE

(75) Inventors: Amit A. Merchant, Portland, OR (US); Darrell D. Boggs, Aloha, OR (US); David J. Sager, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/792,154

(22) Filed: Mar. 2, 2004

(65) Prior Publication Data

US 2004/0172523 A1    Sep. 2, 2004

Related U.S. Application Data

(60) Continuation of application No. 10/060,264, filed on Feb. 1, 2002, now Pat. No. 6,792,446, which is a division of application No. 09/848,423, filed on May 4, 2001, now Pat. No. 6,385,715, which is a continuation of application No. 09/474,082, filed on Dec. 29, 1999, now abandoned, which is a continuation-in-part of application No. 09/106,857, filed on Jun. 30, 1998, now Pat. No. 6,163,838, which is a continuation-in-part of application No. 08/746,547, filed on Nov. 13, 1996, now Pat. No. 5,966,544.

(51) Int. Cl.
G06F 9/46    (2006.01)
G06F 9/40    (2006.01)
G06F 15/76    (2006.01)

(52) U.S. Cl. ..................... 718/108; 712/219; 712/218

(58) Field of Classification Search ................ 718/108, 718/106; 712/219, 215, 245, 218
See application file for complete search history.

(56) References Cited

U.S. PATENT DOCUMENTS

| 5,185,871 A | 2/1993 | Frey et al. .................. 712/205 |
| 5,197,132 A | 3/1993 | Steely, Jr. et al. .......... 395/375 |

(Continued)

OTHER PUBLICATIONS

Wallace et al., Threaded Multiple Path Execution, Jun. 1998, pp. 1-12.

(Continued)

*Primary Examiner*—Larry D. Donaghue
(74) *Attorney, Agent, or Firm*—Kenyon & Kenyon LLP

(57) ABSTRACT

A processor is provided that includes an execution unit for executing instructions and a replay system for replaying instructions which have not executed properly. The replay system is coupled to the execution unit and includes a checker for determining whether each instruction has executed properly and a plurality of replay queues or replay queue sections coupled to the checker for temporarily storing one or more instructions for replay. In one embodiment, thread-specific replay queue sections may each be used to store a long latency instruction for each thread until the long latency instruction is ready to be executed (e.g., data for a load instruction has been retrieved from external memory). By storing the long latency instruction and its dependents in a replay queue section for one thread which has stalled, execution resources are made available for improving the speed of execution of other threads which have not stalled.

12 Claims, 6 Drawing Sheets

U.S. PATENT DOCUMENTS

| | | | |
|---|---|---|---|
| 5,341,482 A | 8/1994 | Cutler et al. | 712/244 |
| 5,519,841 A | 5/1996 | Sager et al. | 711/202 |
| 5,828,868 A | 10/1998 | Sager et al. | 395/556 |
| 5,835,745 A | 11/1998 | Sager et al. | 395/391 |
| 5,966,544 A | 10/1999 | Sager | 712/32 |
| 6,088,790 A | 7/2000 | Grochowski | 712/218 |
| 6,094,717 A | 7/2000 | Merchant et al. | 712/32 |
| 6,163,838 A | 12/2000 | Merchant et al. | 712/219 |
| 6,212,544 B1 | 4/2001 | Borkenhagen et al. | 709/103 |
| 6,507,862 B1 | 1/2003 | Joy et al. | 709/107 |
| 6,535,905 B1 | 3/2003 | Kalafatis et al. | 709/108 |
| 6,542,921 B1 | 4/2003 | Sager | 709/108 |
| 6,792,446 B2 * | 9/2004 | Merchant et al. | 718/108 |

OTHER PUBLICATIONS

Roos et al., Execution Replay of Parallel Programs, 1993, pp. 1-6.

Marcuello et al., Data Speculative Multithreaded Architecture, 1998, pp. 321-324.

Gulati et al., Performance Study of a Multithreaded Superscalar Microprocessor, 1996, pp. 291-301.

Akkary et al., A Dynamic Multithreading Processor, 1998, pp. 226-236.

Tsai et al., Performance Study of a Concurrent Multithreaded Processor, 1998, pp. 24-35.

Lolkkanen et al., A Fine-Grain Multithreading Superscalar Architecture, 1996, pp. 163-168.

* cited by examiner

MULTI-THREADING TECHNIQUES FOR A PROCESSOR UTILIZING A REPLAY QUEUE

CROSS-REFERENCE TO RELATED APPLICATIONS

This application is a continuation of U.S. application Ser. No. 10/060,264, filed Feb. 1, 2002 (now U.S. Pat. No 6,792,446). Which is a divisional of U.S. application No. 09/848,423, filed May 4, 2001 (now U.S. patent No. 6,385,715). Which is a continuation of U.S. application Ser. No. 09/474,082, filed Dec. 29,1999 (now abandoned). Which is a continuation-in-part of U.S. application Ser. No. 09/106,857, filed Jun. 30, 1998 (now U.S. Pat. No. 6,163,838), which is a continuation-in-part of U.S. application Ser. No. 08/746,547, filed Nov. 13, 1996 (now U.S. Pat. No. 5,966,544).

FIELD

The invention generally relates to processors, and in particular to multi-threading techniques for a processor utilizing a replay queue.

BACKGROUND

The primary function of most computer processors is to execute a stream of computer instructions that are retrieved from a storage device. Many processors are designed to fetch an instruction and execute that instruction before fetching the next instruction. Therefore, with these processors, there is an assurance that any register or memory value that is modified or retrieved by a given instruction will be available to instructions following it. For example, consider the following set of instructions:

1) Load memory-1→register-X;
2) Add1 register-X register-Y→register-Z;
3) Add2 register-Y register-Z→register-W.

The first instruction loads the content of memory-1 into register-X. The second instruction adds the content of register-X to the content of register-Y and stores the result in register-Z. The third instruction adds the content of register-Y to the content of register-Y and stores the result in register-W. In this set of instructions, instructions 2 and 3 are considered "dependent" instructions that are dependent on instruction 1. In other words, if register-X is not loaded with valid data in instruction 1 before instructions 2 and 3 are executed, instructions 2 and 3 will generate improper results. With the traditional "fetch and execute" processors, the second instruction will not be executed until the first instruction has properly executed. For example, the second instruction may not be dispatched to the processor until a cache hit/miss signal is received as a result of the first instruction. Further, the third instruction will not be dispatched until an indication that the second instruction has properly executed has been received. Therefore, it can be seen that this short program cannot be executed in less time than $T=L_1+L_2+L_3$, where $L_1$, $L_2$ and $L_3$ represent the latency of the three instructions. Hence, to ultimately execute the program faster, it will be necessary to reduce the latencies of the instructions.

Therefore, there is a need for a computer processor that can schedule and execute instructions with improved speed to reduce latencies.

SUMMARY

According to an embodiment of the present invention, a processor is provided that includes an execution unit to execute instructions and a replay system coupled to the execution unit to replay instructions which have not executed properly. The replay system includes a checker to determine whether each instruction has executed properly and a plurality of replay queues. Each replay queue is coupled to the checker to temporarily store one or more instructions for replay.

BRIEF DESCRIPTION OF THE DRAWINGS

The foregoing and a better understanding of the present invention will become apparent from the following detailed description of exemplary embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and is not limited thereto. The spirit and scope of the present invention being limited only by the terms of the appended claims.

The following represents brief descriptions of the drawings, wherein.

DETAILED DESCRIPTION

I. Introduction

According to an embodiment of the present invention, a processor is provided that speculatively schedules instructions for execution and includes a replay system. Speculative scheduling allows the scheduling latency for instructions to be reduced. The replay system replays instructions that were not correctly executed when they were originally dispatched to an execution unit. For example, a memory load instruction may not execute properly if there is a L0 cache miss during execution, thereby requiring the instruction to be replayed (or re-executed).

However, one challenging aspect of such a replay system is the possibility for long latency instructions to circulate through the replay system and re-execute many times before executing properly. One example of a long latency instruction could be a memory load instruction in which there is a L0 cache miss and a L1 cache miss (i.e., on-chip cache miss) on the first execution attempt. As a result, the execution unit may then retrieve the data from an external memory device across an external bus which can be very time consuming (e.g., requiring several hundred clock cycles). The unnecessary and repeated re-execution of this long latency load instruction before its source data has returned wastes valuable execution resources, prevents other instructions from executing and increases application latency. Where there are multiple threads, one thread can stall due to a long latency instruction, thereby inhibiting execution of the other threads.

Therefore, according to an embodiment, a replay queue is provided for temporarily storing the long latency instruction and its dependent instructions. When the long latency instruction is ready for execution (e.g., when the source data for a memory load instruction returns from external memory), the long latency instruction and the dependent instructions can then be unloaded from the replay queue for execution.

According to an embodiment, the processor may include multiple replay queues, with at least one replay queue being provided per thread or program flow (for example). Alternatively, a replay queue is provided that is partitioned into multiple replay queue sections. In one embodiment, two replay queues are provided for independently processing and storing instructions for threads A and B to be replayed. When a stalled thread is detected by the presence of a long latency instruction for the thread, the long latency instruction and its dependents for the stalled thread can be loaded into a corresponding (e.g., thread-specific) replay queue for the stalled thread to prevent the stalled thread from inhibiting the execution or replay of the remaining threads which have not stalled. Therefore, when one thread stalls or is delayed due to a long latency instruction, execution resources can be more efficiently allocated or made available for the execution of the other threads.

II. Overall System Architecture

Figure 1:
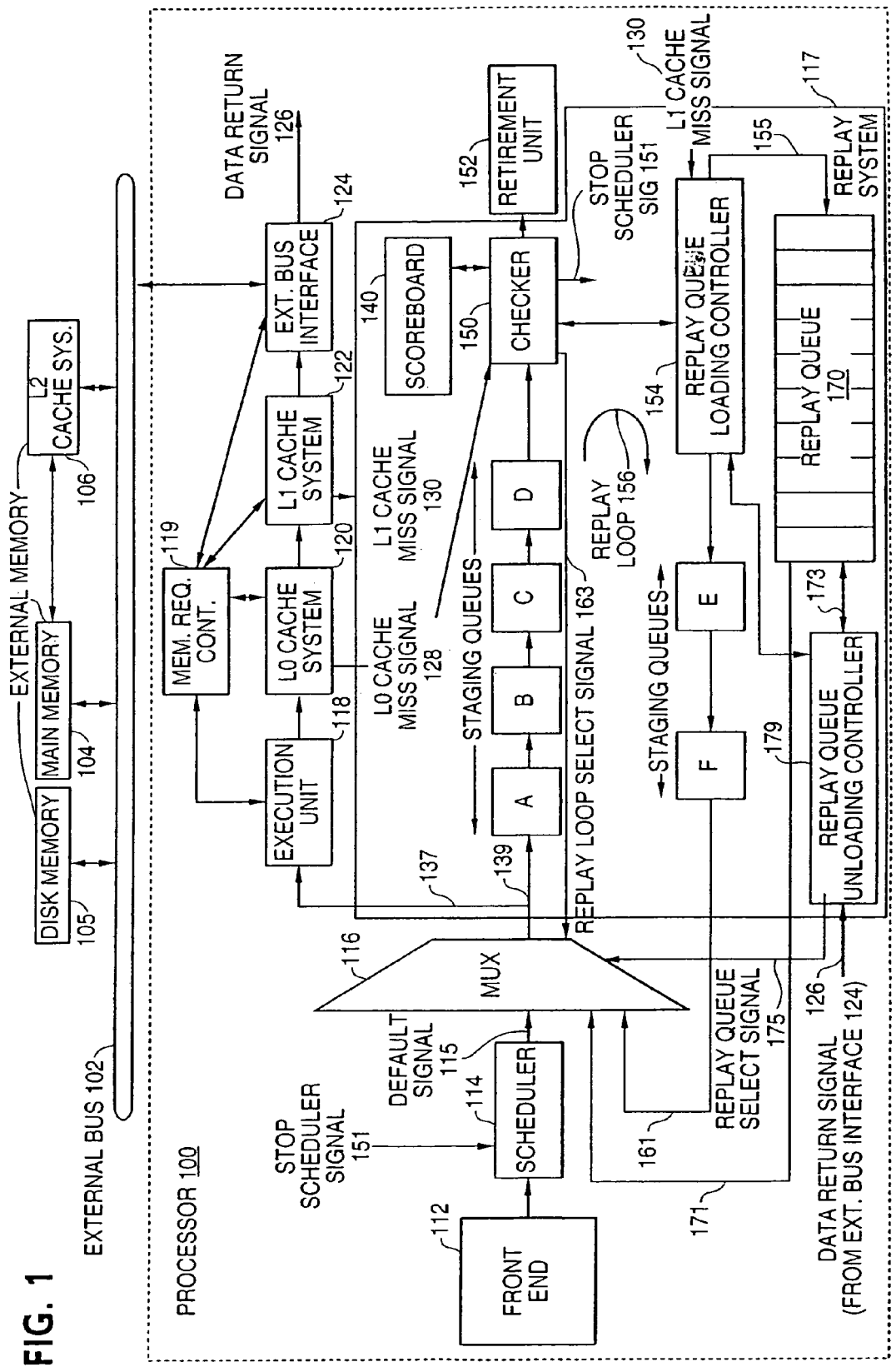
FIG. 1 is a block diagram illustrating a computer system that includes a processor according to an embodiment of the present invention.

FIG. 1 is a block diagram illustrating a computer system that includes a processor according to an embodiment. The processor 100 includes a Front End 112, which may include several units, such as an instruction fetch unit, an instruction decoder for decoding instructions (e.g., for decoding complex instructions into one or more micro-operations or uops), a Register Alias Table (RAT) for mapping logical registers to physical registers for source operands and the destination, and an instruction queue (IQ) for temporarily storing instructions. In one embodiment, the instructions stored in the instruction queue are micro-operations or uops, but other types of instructions can be used. The Front End 112 may include different or even additional units. According to an embodiment, each instruction includes up to two logical sources and one logical destination. The sources and destination are logical registers within the processor 100. The RAT within the Front End 112 may map logical sources and destinations to physical sources and destinations, respectively.

Front End 112 is coupled to a scheduler 114. Scheduler 114 dispatches instructions received from the processor Front End 112 (e.g., from the instruction queue of the Front End 112) when the resources are available to execute the instructions. Normally, scheduler 114 sends out a continuous stream of instructions. However, scheduler 114 is able to detect, by itself or by receiving a signal, when an instruction should not be dispatched. When scheduler 114 detects this, it does not dispatch an instruction in the next clock cycle. When an instruction is not dispatched, a "hole" is formed in the instruction stream from the scheduler 114, and another device can insert an instruction in the hole. The instructions are dispatched from scheduler 114 speculatively. Therefore, scheduler 114 can dispatch an instruction without first determining whether data needed by the instruction is valid or available.

Scheduler 114 outputs the instructions to a dispatch multiplexer (mux) 116. The output of mux 116 includes two parallel paths, including an execution path (beginning at line 137) and a replay path (beginning at line 139). The execution path will be briefly described first while the replay path will be described below in connection with a description of a replay system 117.

The output of the multiplexer 116 is coupled to an execution unit 118. Execution unit 118 executes received instructions. Execution unit 118 can be an arithmetic logic unit ("ALU"), a floating point ALU, a memory unit for performing memory loads (memory data reads) and stores (memory data writes), etc. In the embodiment shown in FIG. 1, execution unit 118 is a memory load unit that is responsible for loading data stored in a memory device to a register (i.e., a data read from memory).

Execution unit 118 is coupled to multiple levels of memory devices that store data. First, execution unit 118 is directly coupled to an L0 cache system 120, which may also be referred to as a data cache. As described herein, the term "cache system" includes all cache related components, including cache memory, and cache TAG memory and hit/miss logic that determines whether requested data is found in the cache memory. L0 cache system 120 is the fastest memory device coupled to execution unit 118. In one embodiment, L0 cache system 120 is located on the same semiconductor die as execution unit 118, and data can be retrieved, for example, in approximately 4 clock cycles.

If data requested by execution unit 118 is not found in L0 cache system. 120, execution unit 118 will attempt to retrieve the data from additional levels of memory devices through a memory request controller 119. After the L0 cache system 120, the next level of memory devices is an L1 cache system 122. Accessing L1 cache system 122 is typically 4–16 times as slow as accessing L0 cache system 120. In one embodiment, L1 cache system 122 is located on the same processor chip as execution unit 118, and data can be retrieved in approximately 24 clock cycles, for example. If the data is not found in L1 cache system 122, execution unit 118 is forced to retrieve the data from the next level memory device, which is an external memory device coupled to an external bus 102. An external bus interface 124 is coupled to memory request controller 119 and external bus 102. The next level of memory device after L1 cache system 122 is an L2 cache system 106. Access to L2 cache system 106 is typically 4–16 times as slow as access to L1 cache system 122. In one embodiment, data can be retrieved from L2 cache system 106 in approximately 200 clock cycles.

After L2 cache system 106, the next level of memory device is main memory 104, which typically comprises dynamic random access memory ("DRAM"), and then disk memory 105. Access to main memory 104 and disk memory 105 is substantially slower than access to L2 cache system 106. In one embodiment, the computer system includes one external bus dedicated to L2 cache system 106, and another external bus used by all other external memory devices. In other embodiments of the present invention, processor 100 can include greater or less levels of memory devices than shown in FIG. 1. Disk memory 105, main memory 104 and L2 cache system 106 may be considered external memory because they are coupled to the processor 100 via external bus 102.

When attempting to load data to a register from memory, execution unit 118 first attempts to load the data from the first and fastest level of memory devices (i.e., L0 cache system 120), and then attempts to load the data from the second fastest level of memory (i.e., L1 cache system 122) and so on. Of course, the memory load takes an increasingly longer time as an additional memory level is required to be accessed. When the data is finally found, the data retrieved by execution unit 118 is also stored in the lower levels of memory devices for future use.

For example, assume that a memory load instruction requires "data-1" to be loaded into a register. Execution unit 118 will first attempt to retrieve data-1 from L0 cache system 120. If it is not found there, execution unit 118 will next attempt to retrieve data-1 from L1 cache system 122. If it is not found there, execution unit 118 will next attempt to retrieve data-1 from L2 cache system 106. If data-1 is retrieved from L2 cache system 106, data-1 will then be stored in L1 cache system 122 and L0 cache system 120 in addition to being retrieved by execution unit 118.

A. General Description Of Replay System

Processor 100 further includes a replay system 117. Replay system 117 replays instructions that were not executed properly when they were initially dispatched by scheduler 114. Replay system 117, like execution unit 118, receives instructions output by dispatch multiplexer 116. Execution unit 118 receives instructions from mux 116 over line 137, while replay system 117 receives instructions over line 139.

Replay system 117 includes two staging sections. One staging section a plurality of staging queues A, B, C and D, while a second staging section is provided as staging queues E and F. Staging queues delay instructions for a fixed number of clock cycles. In one embodiment, staging queues A–F each comprise one or more latches. The number of stages can vary based on the amount of staging or delay desired in each execution channel. Therefore, a copy of each dispatched instruction is staged through staging queues A–D in parallel to being staged through execution unit 118. In this manner, a copy of the instruction is maintained in the staging queues A–D and is provided to a checker 150, described below. This copy of the instruction may then be routed back to mux 116 for re-execution or "replay" if the instruction did not execute properly.

Replay system 117 further includes a checker 150 and a replay queue 170. Generally, checker 150 receives instructions output from staging queue D and then determines which instructions have executed properly and which have not. If the instruction has executed properly, the checker 150 declares the instruction "replay safe" and the instruction is forwarded to retirement unit 152 where instructions are retired in program order. Retiring instructions is beneficial to processor 100 because it frees up processor resources, thus allowing additional instructions to begin execution.

An instruction may execute improperly for many reasons. The most common reasons are a source dependency and an external replay condition. A source dependency can occur when a source of a current instruction is dependent on the result of another instruction. This data dependency can cause the current instruction to execute improperly if the correct data for the source is not available at execution time (i.e., the result of the other instruction is not available as source data at execution time).

A scoreboard 140 is coupled to the checker 150. Scoreboard 140 tracks the readiness of sources. Scoreboard 140 keeps track of whether the source data was valid or correct prior to instruction execution. After the instruction has been executed, checker 150 can read or query the scoreboard 140 to determine whether data sources were not correct. If the sources were not correct at execution time, this indicates that the instruction did not execute properly (due to a data dependency), and the instruction should therefore be replayed.

Examples of an external replay condition may include a cache miss (e.g., source data was not found in L0 cache system 120 at execution time), incorrect forwarding of data (e.g., from a store buffer to a load), hidden memory dependencies, a write back conflict, an unknown data/address, and serializing instructions. The L0 cache system 120 generates a L0 cache miss signal 128 to checker 150 if there was a cache miss to L0 cache system 120 (which indicates that the source data for the instruction was not found in L0 cache system 120). Other signals can similarly be generated to checker 150 to indicate the occurrence of other external replay conditions. In this manner, checker 150 can determine whether each instruction has executed properly.

If the checker 150 determines that the instruction has not executed properly, the instruction will then be returned to multiplexer 116 to be replayed (i.e., re-executed). Each instruction to be replayed will be returned to mux 116 via one of two paths. Specifically, if the checker 150 determines that the instruction should be replayed, the Replay Queue Loading Controller 154 determines whether the instruction should be sent through a replay loop 156 including staging queues E and F, or whether the instruction should be temporarily stored in a replay queue 170 before returning to mux 116. Instructions routed via the replay loop 156 are coupled to mux 116 via line 161. Instructions can also be routed by controller 154 for temporary storage in replay queue 170 (prior to replay). The instructions stored in replay queue 170 are output or unloaded under control of replay queue unloading controller 179. The instructions output from replay queue 170 are coupled to mux 116 via line 171. The operation of replay queue 170, Replay Queue Loading Controller 154 and Replay Queue Unloading Controller 179 are described in detail below.

In conjunction with sending a replayed instruction to mux 116, checker 150 sends a "stop scheduler" signal 151 to scheduler 114. According to an embodiment, stop scheduler signal 151 is sent to scheduler 114 in advance of the replayed instruction reaching the mux 116 (either from replay loop 156 or replay queue 170). In one embodiment, stop scheduler signal 151 instructs the scheduler 114 not to schedule an instruction on the next clock cycle. This creates an open slot or "hole" in the instruction stream output from mux 116 in which a replayed instruction can be inserted. A stop scheduler signal may also be issued from the replay queue unloading controller 179 to scheduler 114.

III. The Need For A Replay Queue

According to one embodiment, all instructions that did not execute properly (i.e., where checker 150 determined that the instructions were not replay safe) can be routed by controller 154 to mux 116 via replay loop 156 (including staging queues E and F). In such a case, all instructions, regardless of the type of instruction or the specific circumstances under which they failed to execute properly, will be routed back to the mux 116 via line 161 for replay. This works fine for short latency instructions which will typically require only one or a small number of passes or iterations through replay loop 156.

As noted above, the instructions of processor 100 may be speculatively scheduled for execution (i.e., before actually waiting for the correct source data to be available) on the expectation that the source data will be available for the majority of the memory load instructions (for example). If it turns out that the source data was not available in L0 cache system 120 at the time of execution, (indicated by L0 cache miss signal 128 being asserted), the checker 150 determines that the instruction is not replay safe and sends the instruction back to mux 116 for replay.

During the period of time while the memory load instruction is being staged in staging queues E, F and A–D for replay, the execution unit 118 will attempt to retrieve the data from additional levels of memory devices through a memory request controller 119, and then store the retrieved data in L0 cache system 120 for the next iteration (the next execution attempt). A L0 cache miss, L1 cache hit may be considered to be a relatively common case for some systems.

According to an embodiment, the delay provided through the replay loop 156 (including through staging queues E–F and A–D) is designed or optimized for an L0 cache miss and a L1 cache hit. In other words, the delay provided through replay loop 156 is usually sufficient to allow data to be retrieved from the L1 cache system and stored back in the L0 cache system 120 prior to execution the second time (i.e., assuming a L0 cache miss and a L1 cache hit on the first execution of the instruction). For relatively short latency instructions like these (eg., where there was a L0 cache miss and a L1 cache hit), only one or few iterations through the replay loop 156 will typically be required before the instruction will execute properly.

However, there may be one or more long latency instructions which will require many iterations through the replay loop 156 before finally executing properly. If the instruction did not execute properly on the first attempt, the checker 150 may determine whether the instruction requires a relatively long period of time to execute (i.e., a long latency instruction), requiring several passes through the replay loop 156 before executing properly. There are many examples of long latency instructions. One example is a divide instruction which may require many clock cycles to execute.

Another example of a long latency instruction is a memory load or store instruction where there was an L0 cache system miss and an L1 cache system miss. In such a case, an external bus request will be required to retrieve the data for the instruction. If access across an external bus is required to retrieve the desired data, the access delay is substantially increased. To retrieve data from an external memory, the memory request controller 119 may be required to arbitrate for ownership of the external bus 102 and then issue a bus transaction (memory read) to bus 102, and then await return of the data from one of the external memory devices. As an example, according to an embodiment, approximately 200 clock cycles may be required to retrieve data from a memory device on an external bus versus 4–24 clock cycles to retrieve data from L0 cache system 120 or L1 cache system 122. Thus, due to the need to retrieve data from an external memory device across the external bus 102, this load instruction where there was a L1 Cache miss may be considered to be a long latency instruction.

During this relatively long period of time while the long latency instruction is being processed (e.g., while the data is being retrieved across the external bus 102 for a L1 cache miss), the instruction may circulate tens or even hundreds of iterations through the replay loop 156. Each time the long latency instruction is replayed before the source data has returned, this instruction unnecessarily occupies a slot in the output of mux 116 and uses execution resources which could have been allocated to other instructions which are ready to execute properly. Moreover, there may be many additional instructions which are dependent upon the result of this long latency load instruction. As a result, each of these dependent instructions also will similarly repeatedly circulate through the replay loop 156 without properly executing. All of these dependent instructions will not execute properly until after the data for the long latency instruction returns from the external memory device, occupying and wasting even additional execution resources. Thus, the many unnecessary and excessive iterations through the replay loop 156 before the return of the data wastes valuable resources, wastes power and increases the application latency.

For example, where several calculations are being performed for displaying pixels on a display, an instruction for one of the pixels may be a long latency instruction, e.g., requiring a memory access to an external memory device. There may be many non-dependent instructions for other pixels behind this long latency instruction that do not require an external memory access. As a result, by continuously replaying the long latency instruction and its many dependent instructions thereon, the non-dependent instructions for the other pixels may be precluded from execution. Once the long latency instruction has properly executed, execution slots and resources become available and the instructions for the other pixels can then be executed. An improved solution would be to allow the non-dependent instructions to execute in parallel while the long latency instruction awaits return of its data.

According to an embodiment, an advantageous solution to this problem is to temporarily store the long latency instruction in a replay queue 170 along with its dependent instructions. When the data for the long latency instruction returns from the external memory device, the long latency instruction and its dependent instructions can then be unloaded from the replay queue 170 and sent to mux 116 for replay. In this manner, the long latency instruction will typically not "clog" or unnecessarily delay execution of other non-dependent instructions.

Therefore, the advantages of using a replay queue in this manner include:

a) prudent and efficient use of execution resources—execution resources are not wasted on instructions which have no hope of executing properly at that time;

b) power savings—since power is not wasted on executing long latency instructions before their data is available;

c) reduce overall latency of application—since independent instructions are permitted to execute in parallel while the data is being retrieved from external memory for the long latency instruction; and d) instructions having different and unknown latencies can be accommodated using the same hardware because, according to an embodiment, the instruction in the replay queue will be executed upon return of the data (whenever that occurs).

IV. Operation Of the Replay Queue and Corresponding Control Logic

According to an embodiment, a long latency instruction is identified and loaded into replay queue 170. One or more additional instructions (e.g., which may be dependent upon the long latency instruction) may also be loaded into the replay queue 170. When the condition causing the instruction to not complete successfully is cleared (e.g., when the data returns from the external bus after a cache miss or after completion of a division or multiplication operation or completion of another long latency instruction), the replay queue 170 is then unloaded so that the long latency instruction and the others stored in replay queue 170 may then be re-executed (replayed).

According to one particular embodiment, replay queue loading controller 154 detects a L1 cache miss (indicating that there was both a L0 cache miss and a L1 cache miss). As shown in the example embodiment of FIG. 1, L1 cache system 122 detects a L1 cache miss and generates or outputs a L1 cache miss signal 130 to controller 154. Because there was also a L0 cache miss, L0 cache miss signal 128 is also asserted (an external replay condition), indicating to checker 150 that the instruction did not execute properly. Because the instruction did not execute properly, checker 150 provides the instruction received from staging queue D to replay queue loading controller 154. Controller 154 must then determine whether to route the replay instruction to mux 116 via replay loop 156 or via replay queue 170.

According to an embodiment, if the replay queue loading controller 154 determines that the instruction is not a long latency instruction, the instruction is sent to mux 116 for replay via replay loop 156. However, if controller 154 determines that the instruction is a long latency instruction (e.g., where an external memory access is required), the controller 154 will load the instruction into replay queue 170. In addition, replay queue loading controller 154 must also determine what instructions behind the long latency (or agent) instruction should also be placed into replay queue 170. Preferably, all instructions that are dependent upon the long latency instruction (or agent instruction) should also be placed in the replay queue 170 because these will also not execute properly until return of the data for the agent instruction. However, it can sometimes be difficult to identify dependent instructions because there can be hidden memory dependencies, etc. Therefore, according to an embodiment, once the long latency or agent instruction has been identified and loaded into the replay queue 170, all additional instructions which do not execute properly and have a sequence number greater than that of the agent instruction (i.e., are programmatically younger than the agent instruction) will be loaded into the replay queue 170 as well.

Replay queue unloading controller 179 preferably receives a signal when the condition causing the instruction to not complete or execute successfully has been cleared (e.g., when the long latency instruction in the replay queue 170 is ready to be executed). As an example, when the data for the long latency instruction returns from the external memory device, the external bus interface 124 asserts the data return signal 126 to replay queue unloading controller 179. Replay queue unloading controller 179 then unloads the instruction(s) stored in the replay queue 170, e.g., in a first-in, first-out (FIFO) manner, to mux 116 for replay (re-execution). The expectation is that the long latency instruction (and its dependents) will now properly execute because the long latency instruction is ready to be executed (e.g., the source data for the long latency instruction is now available in L0 cache system 120).

A. Arbitration/Priority

As described above, mux 116 will receive instructions from three sources: instructions from scheduler 114, instructions provided via line 161 from replay loop 156 and instructions provided via line 171 which are output from replay queue 170 (e.g., after return of the source data for the agent instruction). However, mux 116 can output or dispatch only one instruction per execution port at a time to execution unit 118. Therefore, an arbitration (or selection) mechanism should be provided to determine which of three instruction paths should be output or selected by mux 116 in the event instructions are provided on more than one path. If instructions are provided only from scheduler 114, then the instructions provided over line 115 from scheduler 114 are the default selection for mux 116.

According to an embodiment, the checker 150, controller 154 and controller 179 can arbitrate to decide which path will be selected for output by mux 116. Once the checker 150 and controllers 154 and 175 have determined which path will be selected for output, the replay loop select signal 163 may be asserted to select the instruction from the replay loop 156, or the replay queue select signal 175 may be asserted to select the instruction output from the replay queue 170. If the instruction path from scheduler 114 is selected for output, then neither select signal 163 nor select signal 179 will be asserted (indicating the default selection from scheduler 114).

Checker 150 and controllers 154 and 179 may use any of several arbitration algorithms to determine which of three instruction paths should be output or selected by mux 116 in the event instructions are provided on more than one path. A couple of example arbitration (or selection) algorithms will be described, but the present invention is not limited thereto.

1. Fixed Priority Scheme

According to one embodiment, a fixed priority scheme may be used, for example, where the replay queue 170 is given priority over the replay loop 156, which is given priority over the scheduler 114. Other fixed priority schemes may be used as well.

2. Age Priority Scheme

A second possible arbitration algorithm is where the oldest instruction is given priority for execution (i.e., oldest instruction is selected by mux 116) regardless of the path. In this embodiment, checker 150 and controllers 154 and 179 may compare the age of an instruction in the replay loop 156 to the age of an instruction to be output from the scheduler 114 to the age of an instruction to be output from the replay queue 170 (assuming an instruction is prepared to be output from the replay queue 170). According to an embodiment, the age comparison between instructions may be performed by comparing sequence numbers of instructions, with a smaller or lower sequence number indicating a programmatically older (or preceding) instruction, which would be given priority in this scheme. In the event that an instruction is output from checker 150 to be replayed and an instruction is output from replay queue 170 to mux 116 for execution, the replayed instruction output from checker 150 may be stored in the replay queue 170.

B. Example Instruction Format

Figure 3:
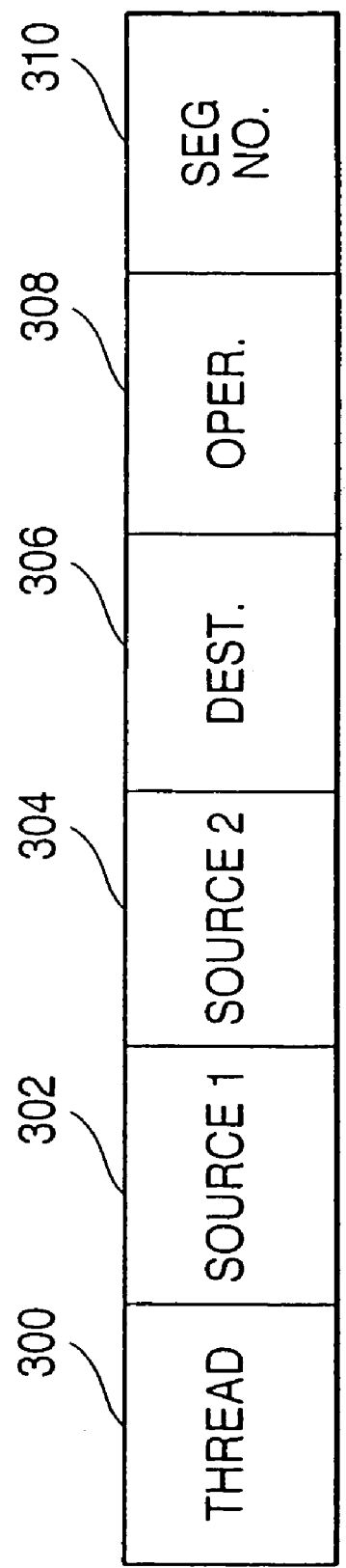
FIG. 3 is a diagram illustrating an example format of an instruction provided in a replay path according to an embodiment of the present invention.

FIG. 3 is a diagram illustrating an example format of an instruction provided in a replay path according to an embodiment. As shown in FIG. 3, the instruction that is staged along the replay path (e.g., beginning at line 137) may include several fields, such as the sources (source 1 302 and source2 304), a destination 306 and an operation field that identifies the operation to be performed (e.g., memory load). A sequence number 310 is also provided to identify the age or program order of the instructions. According to an embodiment, processor 100 may be a multi-threaded machine. Therefore, a thread field 300 identifies which thread an instruction belongs.

C. Another Example

Figure 2:
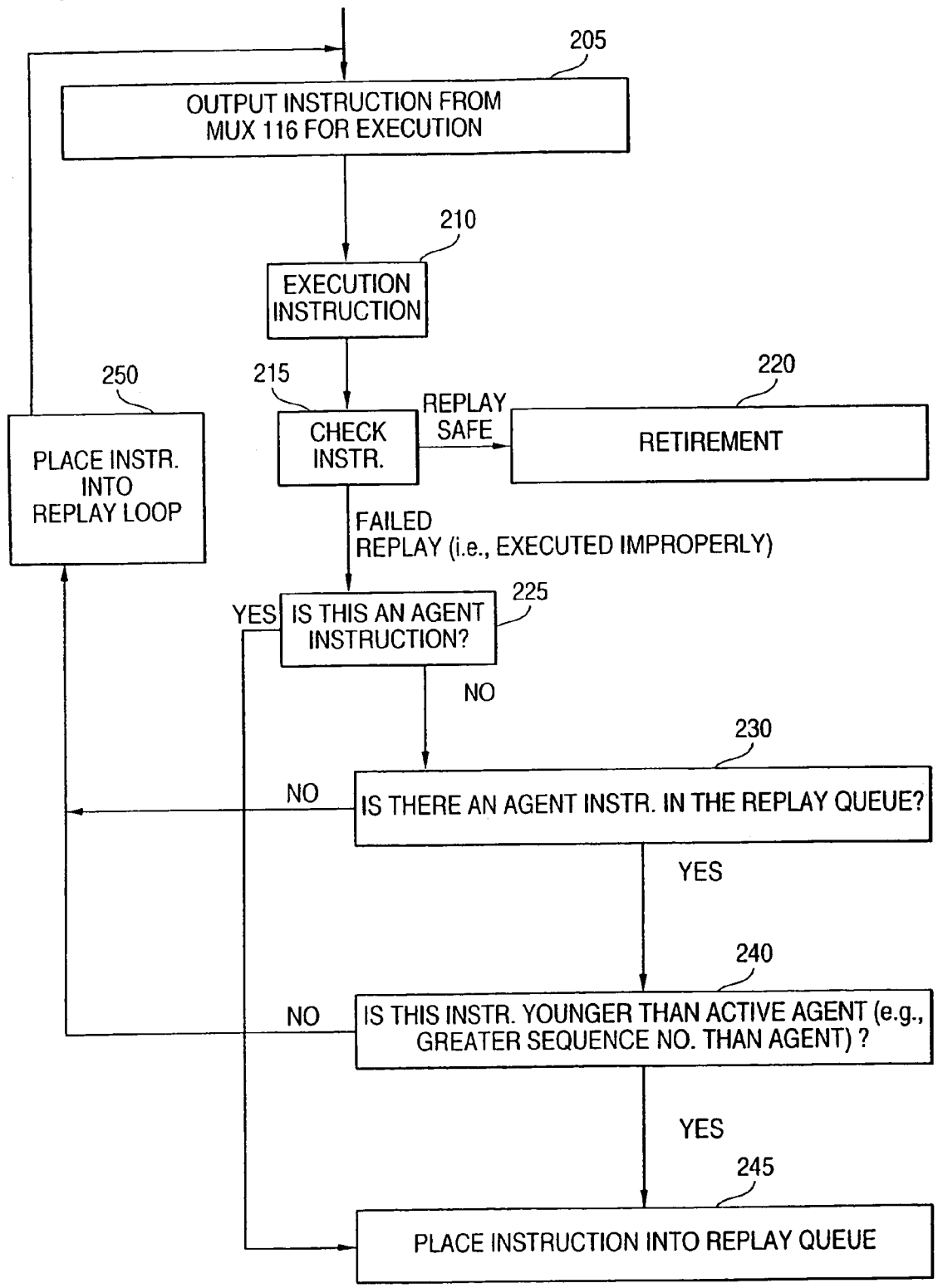
FIG. 2 is a flow chart illustrating an example operation of instruction processing.

FIG. 2 is a flow chart illustrating an example operation of instruction processing. At block 205, an instruction is output by mux 116 (from one of the three paths). At block 210, the instruction is executed by execution unit 118. At block 215, checker 150 determines whether the instruction executed properly or not. If the instruction executed properly (i.e., the instruction is "replay safe"), the instruction is sent to retirement unit 152, block 220. If the instruction did not execute properly (e.g., failed replay), then the process proceeds to block 225.

At block 225, it is determined whether the instruction is an agent instruction (or a long latency instruction). One example way that this is performed is by replay queue loading controller 154 receiving a L1 cache miss signal 130 if there is a L1 cache miss. There are other instances where a long latency or agent instruction can be detected (such as a divide instruction). If this instruction is an agent or long latency instruction, the instruction is loaded into replay queue 170, block 245.

If the instruction is not an agent instruction, process proceeds to block 230. At block 230, the controller 154 determines if there is already an agent instruction in the replay queue. If there is no agent instruction in queue 170, the instruction is placed into the replay loop 156 for replay, block 250.

Next, the checker 150 and/or controller 154 determines whether this instruction is younger than the agent instruction in the replay queue, by comparing sequence numbers of the two instructions. If the instruction is younger than the agent instruction in the replay queue 170, the instruction is then loaded into the replay queue 170 to wait until the agent instruction is ready to be properly executed or when the condition that caused the agent to improperly execute to be cleared or resolved (e.g., to wait until the data for the agent returns from the external memory device).

It is also possible for multiple agent instructions to be loaded into replay queue in such case, each agent instruction and its dependent instructions in the queue may be unloaded based on the agent being able to execute properly (e.g., source data for the agent returning from an external memory device). According to one embodiment, all instructions in the replay queue 170 may be unloaded when first agent instruction in the queue 170 is ready to be executed properly (e.g., when the data has returned from the external bus). In an alternative embodiment, only those dependent instructions stored in the replay queue 170 after the agent that is ready to execute and before the next agent are unloaded when the agent is ready to execute properly. In the case of multiple agent instructions, the steps of FIG. 2 may be performed in parallel for each agent instruction.

Therefore, it can be seen from the embodiment of FIG. 2, that a (non-agent) instruction is placed in the replay queue 170 if three conditions are met (according to an example embodiment):

a) the instruction did not properly execute (otherwise, the instruction will be retired, not replayed); and b) there is already an agent instruction in the replay queue 170 (an active agent); and c) the instruction is programmatically younger than the agent instruction in the replay queue 170 (i.e., a greater sequence number than the agent).

D. Multiple Replay Queues

Figure 4:
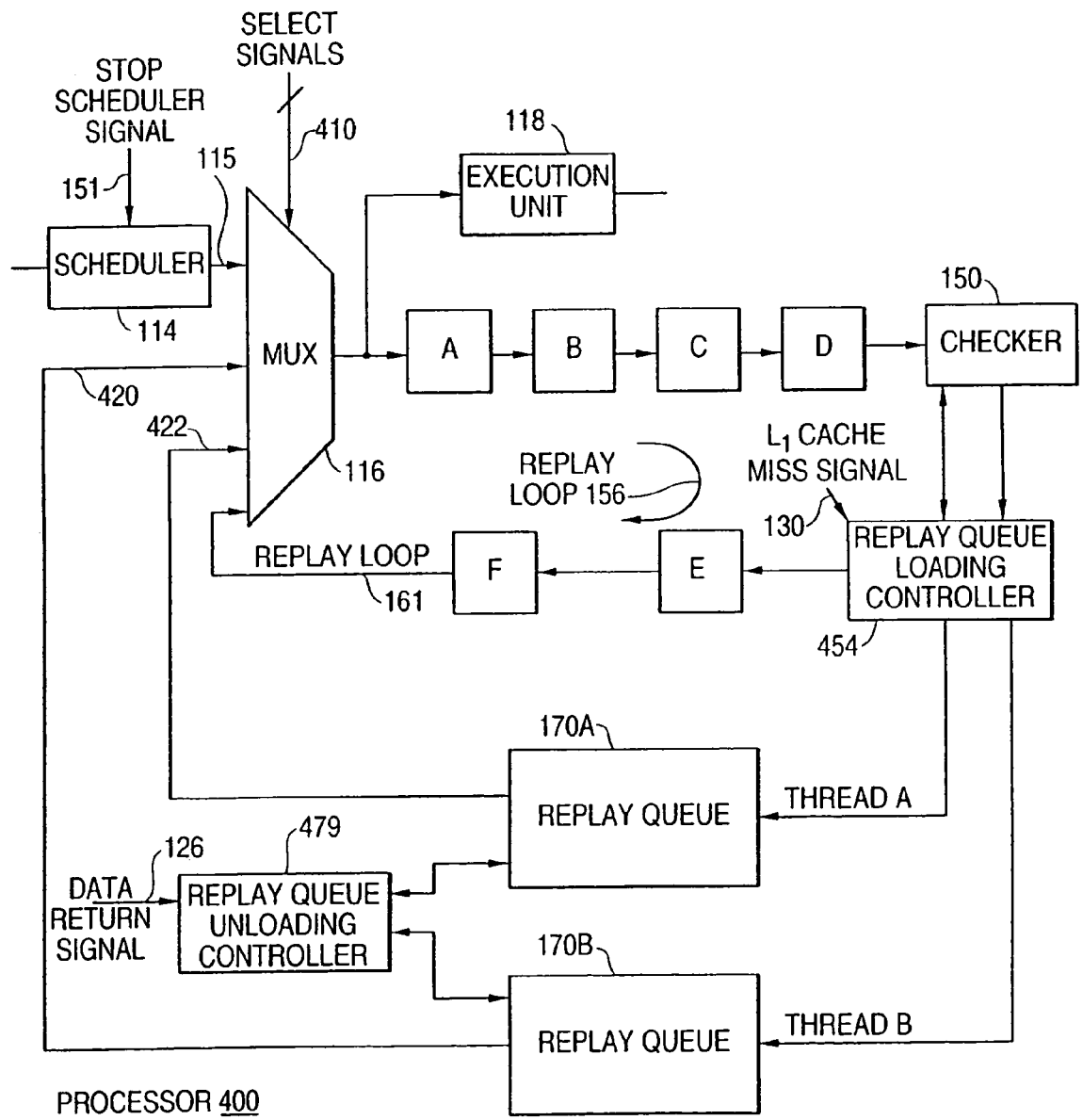
FIG. 4 is a block diagram illustrating a portion of a processor according to another embodiment of the invention.

FIG. 4 is a block diagram illustrating a portion of a processor according to another embodiment. Referring to FIG. 4, a portion of processor 400 is illustrated. Processor 400 may be very similar to processor 100 described above. Therefore, many of the components in processor 400 are the same as those in processor 100 (FIG. 1), or which may be well known processor components, are not illustrated in FIG. 4. Only the differences between the processor 100 and processor 400 will be described in detail. According to an embodiment, processor 400 is a multiple threaded (or multi-threaded) machine (e.g., 2, 3, 4 or more threads).

According to an embodiment, processor 400 includes multiple replay queues, with at least one replay queue being provided per thread. In a similar embodiment, a single replay queue is provided that is partitioned into sections for the different threads. As an example embodiment, the processor 400 includes two replay queues: a replay queue 170A and a replay queue 170B. Additional replay queues can be provided. Replay queue 170A is provided for receiving an agent instruction of thread A, and additional instructions of thread A which are dependent on the thread A agent. Replay queue 170B is provided for receiving an agent instruction of thread B, and additional instructions of thread B which are dependent on the thread B agent. In addition, each replay queue can receive and store multiple agent instructions for the respective thread. Alternatively, separate replay queues may be provided for each agent instruction per thread.

Replay queue loading controller 454 is coupled to checker 150 and determines whether to load an improperly executed instruction (output from checker 150) into one of replay queues 170A or 1701 or to send the instruction to mux 116 via the replay loop 156. In addition to examining the sequence number field 310 (as described above for controller 154 in FIG. 1), the controller 454 may also examine the thread field 300 (FIG. 3) in the instruction in determining whether to load an instruction into either replay queue 170A (if the instruction belongs to thread A) or into replay queue 170B (if the instruction belongs to thread B).

According to an embodiment, the checker 150, controller 454 and controller 479 can arbitrate to decide which path will be selected for output by mux 116. Instead of selecting one of three instruction paths as in the embodiment of FIG. 1, the processor of FIG. 4 selects one of four instruction paths, including the instruction path over line 115 from scheduler 114 (which is a default path), the instruction path over line 161 from replay loop 156, the instruction path over line 422 output from replay queue 170A and the instruction path over line 420 output from replay queue 170B. There may be additional paths if additional replay queues are provided.

Controllers 454, 479 and checker 150 may generate select signals 410 to select one of the four paths for output from mux 116. For example, when a data return signal is generated corresponding to the agent instruction stored in replay queue 170A, the select signals 410 are generated to select line 422 from replay queue 170A and the instructions stored in replay queue 170A is then unloaded for replay.

Like the embodiment of FIG. 1, the processor of FIG. 4 can use any of several types of arbitration or priority schemes, including a fixed priority scheme and an age priority scheme, as examples. For example, in a fixed priority scheme, the replay queue 170A (from thread A) is given priority over the replay queue 170B (from thread B), which is given priority over the replay loop 156, which is given priority over the scheduler 114. Other fixed priority schemes may be used as well. For instance, replay queue 170B may instead be given priority over replay queue 170A. In an advantageous priority scheme, priority is rotated among the multiple threads to allow each un-stalled thread to have fair access to the execution resources.

Replay queue unloading controller 479 (FIG. 4) operates in a fashion that is similar to replay queue unloading controller 179 (FIG. 1). The instructions stored in replay queues 170A and 170B are output or unloaded under control of replay queue unloading controller 479. Replay queue unloading controller 479 preferably receives a signal when a long latency instruction in one of the replay queues 170A or 170B is ready to be executed. As an example, when the data for a long latency instruction (e.g., load instruction) returns from the external memory device, the external bus interface 124 asserts the data return signal 126 to replay queue unloading controller 479. Replay queue unloading controller 479 identifies the thread and the instruction to be unloaded from the appropriate replay queue. Controller 479 can then sequentially unload the instruction(s) stored in the corresponding replay queue 170 to mux 116 for replay (re-execution).

According to an embodiment, thread A and thread B are processed independently by the replay system of processor 400. If a long latency or agent instruction is detected by replay queue loading controller 454 (e.g., by receiving the L1 cache miss signal 130), controller 454 must then select one of the two replay queues (170A or 170B) for receiving the agent instruction by examining the thread field 300 (FIG. 3) for the instruction for example. If the agent (or long latency) instruction is for thread A then the agent is loaded into replay queue 170A. While, if the agent instruction is for thread B, the agent is loaded into replay queue 170B.

An example operation of the multi-threaded processor 400 with two replay queues 170A and 170B will now be briefly described. In this example, it is assumed that the current instruction output from checker 150 is an agent instruction and is part of thread A, and thus, is loaded into replay queue 170A. Additional instructions which fail to execute properly are sent from checker 150 to controller 454. If the instruction is part of thread A, the instruction is loaded into replay queue 170A if it is either an agent instruction or if it is younger than the agent instruction present in replay queue 170A.

If the next instruction is part of thread B, it is determined whether or not the instruction is an agent (i.e., long latency) instruction. If the thread B instruction is an agent instruction, it is loaded into replay queue 170B. Otherwise, if the thread B instruction is not an agent instruction and there is no agent in replay queue 170B, the thread B instruction is routed to mux 116 via replay loop 156 (even if there is an agent or long latency instruction in replay queue 170A).

Once an agent instruction for thread B has been detected loaded into replay queue 170B, younger thread B instructions will also then be loaded into replay queue 170B behind the thread B agent (rather than being forwarded to mux 116 via replay loop 156).

Thus, as described above, the instructions for both threads A and B pass through checker 150 and controller 454. However, a determination or decision to either load an improperly executed instruction into a corresponding (e.g., thread-specific) replay queue or to forward the instruction to mux 116 via the replay loop 156 is made independently for each of threads A and B. Thus, if an agent or long latency instruction and its dependent instructions are detected and stored in replay queue 170A for thread A, the improperly executed instructions for thread B will preferably continue to be routed back to mux 116 via replay loop 156 until an agent instruction is detected for thread B. In a similar manner, when the agent instruction in replay queue 170A for thread A is ready to execute (e.g., when source data has returned from external memory), the agent instruction and the dependents in replay queue 170A may then be sequentially unloaded from replay queue 170A and selected by mux 116.

Figure 5:
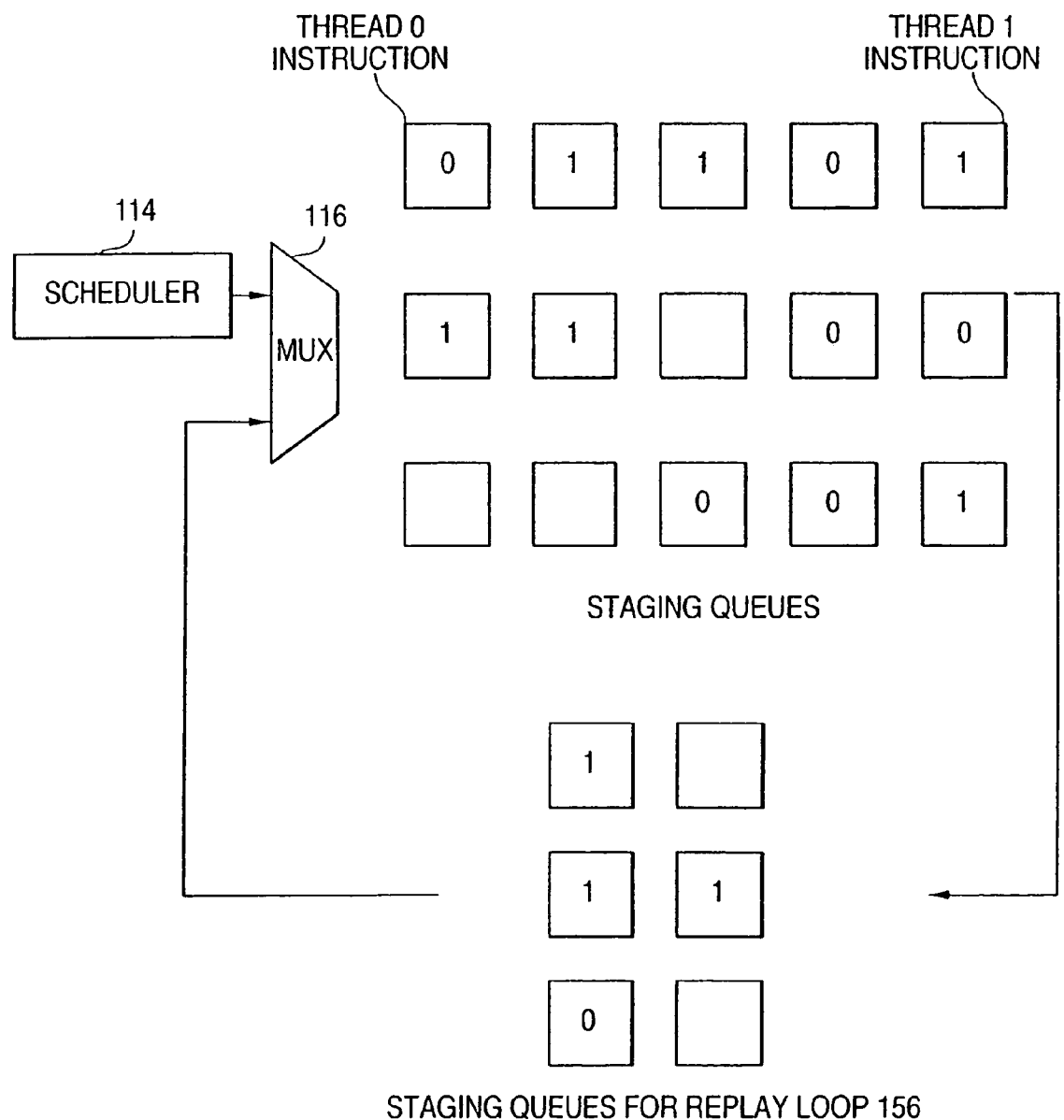
FIG. 5 is a block diagram illustrating a portion of a replay system according to another embodiment of the invention.

FIG. 5 is a block diagram illustrating a portion of a replay system according to another embodiment of the invention. The replay system shown in FIG. 5 is part of a processor that is a multi-threaded processor (e.g., can handle 2, 3, 4, 5 or more threads). In this particular embodiment, only two threads (thread 0 and thread 1) are shown for simplicity, but more threads are possible. FIG. 5 is used to illustrate problems which can occur when one thread stalls, in the absence of a replay queue. In FIG. 5, the mux 116 outputs three instructions at a time (e.g., outputs three instructions per clock cycle). Mux 116 outputs instructions to three rows of staging queues. Three rows of staging queues for a replay loop 156 are also shown. A 0 or 1 in a staging queue indicates that the staging queue contains an instruction for the identified thread. If no number is present in a queue, this indicates that the staging queue does not present contain an instruction. After passing through the staging queues, the instructions then pass through a checker 150 (not shown in FIG. 5). If the instruction did not properly execute, the instruction may then be routed to the staging queues for replay loop 156.

In the example shown in FIG. 5, it is assumed that one of the instructions for thread 1 (an agent instruction) is a long latency instruction which is still pending (not yet resolved). As a result, instructions for thread 1 stall (e.g., none of the thread 1 instructions will execute properly and retire) because an agent instruction for thread 1 is a pending long latency instruction. The instructions of thread 1 which are dependent on the agent instruction will not be able to make forward progress (retire) and will continually replay until the agent instruction properly executes. As a result, more and more of the staging queues and other resources become occupied by instructions for thread 1, thereby inhibiting the entry and execution of the thread 0 instructions (the well-behaved or non-stalled thread). According to an embodiment, a replay queue can be used to temporarily store the long latency instruction for thread 1 and its dependents until the condition which caused the long latency clears or becomes resolved.

Figure 6:
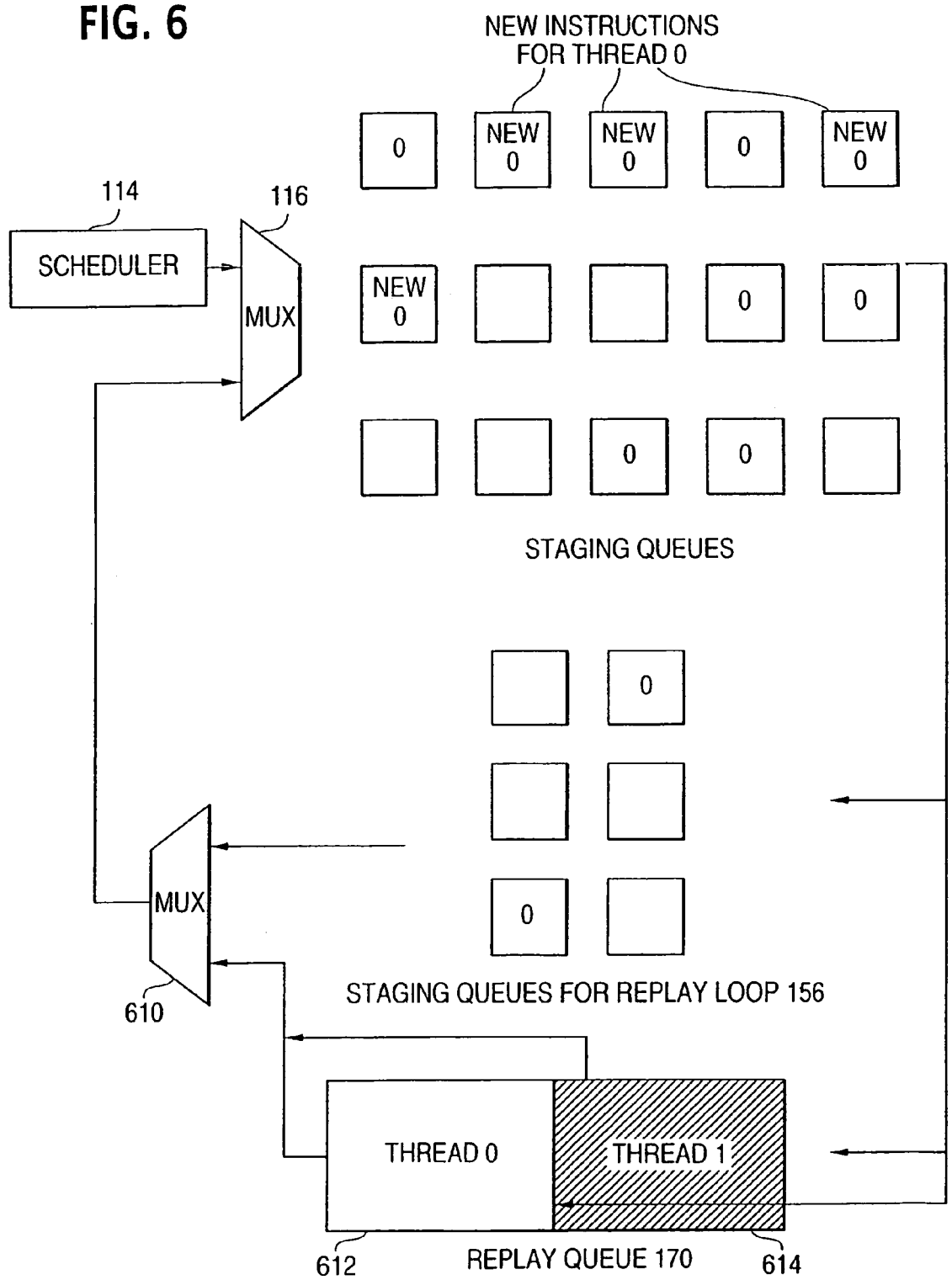
FIG. 6 is a block diagram illustrating a portion of a replay system according to yet another embodiment.

FIG. 6 is a block diagram illustrating a portion of a replay system according to yet another embodiment. As shown in FIG. 6, the replay system includes a replay queue 170 which is partitioned into multiple sections. One replay queue section is provided for each thread of the processor. According to an embodiment, replay queue 170 includes a replay queue section 612 for thread 0 and a replay queue section 614 for thread 1, although more replay sections would be provided if more threads are used. A mux 610 is also provided to select either replay loop 156 or the replay queue 170. An additional mux (not shown) can also be used to select one of the two replay queue sections for output to mux 116.

Referring to FIG. 6, according to an embodiment, the replay system detected the long latency (agent) instruction of thread 1 and stored the long latency instruction and one or more other instructions of thread 1 in replay queue section 614. The storage or presence of the instructions for thread 1 in replay queue section 614 is indicated by the shading or diagonal lines in section 614 in FIG. 6. Also, no instructions are presently stored in replay queue section 612. By temporarily storing the instructions of the stalled thread (thread 1 in this example) in a corresponding replay queue section (section 614), additional staging queues and other resources are made available for the execution of the other threads which have not stalled (thread 0 in this example). Thus, as shown in FIG. 6, several instructions for thread 0 continue to propagate through the staging queues of the replay system. In addition, new thread 0 instructions are output by mux 116 for execution. These new instructions for thread 0 were previously inhibited or blocked by the stalled thread 1 instructions where no replay queue 170 was used, as shown in FIG. 5.

As a result, when one thread stalls or is delayed due to a long latency instruction, the instructions for the stalled or delayed thread can be temporarily stored in a queue (or a portion of a replay queue) so that the stalled thread will not block the other threads or occupy execution resources that prevents inhibits the execution of the other threads in the processor. Thus, through the use of one or more replay queues (or replay queue sections) per thread, in the event of one or more stalled threads (i.e., presence of a long latency instruction for one or more threads), execution resources can be more efficiently allocated to the remaining threads which have not stalled.

In the case of two threads, there are four cases described below:

1) Thread 0 is pending the return of a long latency operation (and thus, is stalled);
2) Thread 1 is pending the return of a long latency operation (and thus, is stalled);
3) Both thread 0 and thread 1 are pending the return of a long latency operation (and thus, both are stalled); and
4) Neither thread is pending the return of a long latency operation (and thus, neither are stalled).

Case 1: According to an example embodiment, all instructions programmatically after (younger than) the agent instruction of thread 0 (the stalled thread) are placed or stored in the thread 0 partition or section 612 of the replay queue 170. All the other instructions which execute improperly are routed through the replay loop 156 to mux 116;

Case 2: According to an example embodiment, all instructions programmatically after (younger than) the agent instruction of thread 1 (the stalled thread) are placed or stored in the thread 1 partition or section 614 of the replay queue 170. All the other instructions which execute improperly are routed through the replay loop 156 to mux 116.

Case 3: According to an embodiment, all instructions programmatically after the agent instruction of thread 0 which have executed improperly are stored in the thread 0 section 612 of the replay queue 170. All instructions programmatically after the agent instruction of thread 1 which have executed improperly are stored in the thread 1 section or partition of the replay queue. All other instructions which execute improperly are routed through the replay loop 156 to mux 116.

Case 4: According to an embodiment, all instructions go through or are routed through the replay loop 156.

In addition, there are several possible cases regarding when instructions are in the replay queue (or in a replay queue section). Four cases are described below:

1) Neither thread is in the replay queue or had a pending long latency operation. In this case, there is no change. Both threads continue to replay through the replay loop 156 (for instructions which execute improperly).
2) Both threads are in the queue and are awaiting for their stalled conditions to be cleared (awaiting return of data). There is no change here. Both threads continue to be stored in their respective replay queue sections, each awaiting the stalled condition to be cleared before being unloaded to mux 116 (e.g., each awaiting return of data).
3) The condition that created the stall or long latency for one of the threads is cleared (e.g., data has returned from the long latency operation). The other thread is still pending (e.g., is still awaiting the return of data from the long latency operation) or doesn't have a long latency operation pending. After the condition that created a stalled thread is cleared (e.g., after the data has returned), the instructions for that thread are unloaded from the corresponding replay queue section and merged back into the replay path. There is no change in the instructions for the other thread (e.g., the instructions for the other thread continue to pass through the replay loop 156, or continue to be stored in the other section of the replay queue, as before).
4) Both instructions are in their respective replay queue sections, awaiting the stalled conditions to clear (e.g., an agent instruction for each thread is awaiting return data). The conditions creating the stalls then release or clear for both threads (e.g., both threads receive the return data). The stalled conditions for the two threads may clear at the same time or at different times. Therefore, instructions can then be unloaded from both replay queue sections to mux 116 for replay. According to an embodiment, however, an instruction from only one of the multiple replay queue sections can be output to mux 116 at a time (e.g., one per clock cycle). According to an embodiment, if multiple threads are ready to be unloaded from the replay queue 170, priority can be rotated between the threads or replay queue sections to provide equal access to both (or all) threads which are un-stalled and ready to be unloaded from the replay queue 170. Thus, where data has returned for both threads which are stored in replay queue sections, an instruction can be alternately output from each replay queue section (for un-stalled threads) on a per clock cycle basis, for example.

In some embodiments, a higher priority may be given to one thread (replay queue section) than another. For example, an operating system may configure or instruct the processor to provide a higher priority to one thread over the others. Thus, if both threads are ready to be unloaded from their respective replay queue sections, all of the instructions of the higher priority thread stored in the corresponding replay queue section will be unloaded before the instructions of the other thread stored in the replay queue. Other embodiments are possible.

According to an embodiment, processor resources can typically be shared among multiple threads (e.g., providing a fair access to resources for all threads). However, when one of the threads becomes stalled, the replay queue allows resources to be shifted to un-stalled (or well behaved) threads allowing the un-stalled threads to make improved progress. This allows processor resources to be more efficiently used or exploited fully for thread level parallelism.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A method comprising:
   initially allocating execution resources for multiple threads;
   determining that a first thread has stalled;
   temporarily storing one or more instructions of the first thread in a replay queue; and
   continuing to allocate execution resources to other threads which have not stalled.

2. The method of claim 1 wherein said step of continuing to allocate comprises the step of continuing to allocate execution resources to the other threads which have not stalled and inhibiting the allocation of further resources to the stalled thread by temporarily storing the stalled thread instructions in the replay queue.

3. The method of claim 1 wherein priority for execution resources are allocated to the other threads which have not stalled on a rotating priority basis.

4. The method of claim 1 and further comprising the steps of:
   detecting that the first thread is no longer stalled;
   unloading the one or more instructions of the first thread from the replay queue; and
   re-allocating at least some execution resources to the first thread.

5. The method of claim 1 wherein the step of determining that a first thread has stalled comprises detecting a long latency or agent instruction for the first thread.

6. The method of claim 1, further comprising routing the one or more instructions of the first thread stored in the replay queue to an execution unit for re-executing the one or more instructions of the first thread.

7. The method of claim 1, further comprising:
   determining that a second thread has stalled;
   temporarily storing one or more instructions of the second thread; and
   continuing to allocate execution resources to other threads which have not stalled.

8. A method comprising:
   allocating execution resources for multiple threads;
   determining that a first thread has stalled;
   storing one or more instructions of the first thread in a first thread replay queue section;
   determining that a second thread has stalled; and
   storing one or more instructions of the second thread in a second thread replay queue section.

9. The method of claim 8 wherein priority for execution resources are allocated to the other threads which have riot stalled on a rotating priority basis.

10. The method of claim 8 and further comprising the steps of:
    detecting that the first thread is no longer stalled;
    unloading the one or more instructions of the first thread from the replay queue; and
    re-allocating at least some execution resources to the first thread.

11. The method of claim 8 wherein the step of determining that a first thread has stalled comprises detecting a long latency or agent instruction for the first thread.

12. The method of claim 8 further comprising routing the one or more instructions of the first thread stored in the replay queue to an execution unit for re-executing the one or more instructions of the first thread.

* * * * *

UNITED STATES PATENT AND TRADEMARK OFFICE
CERTIFICATE OF CORRECTION

| | |
|---|---|
| PATENT NO. | : 7,219,349 B2 |
| APPLICATION NO. | : 10/792154 |
| DATED | : May 15, 2007 |
| INVENTOR(S) | : Amit A. Merchant et al. |

It is certified that error appears in the above-identified patent and that said Letters Patent is hereby corrected as shown below:

Column 1, Line 46 "register–Y" should be --register–Z--

Column 10, Line 52 "(source 1 302" should be --source1 302--

Column 12, Line 20 "170A or 1701" should be --170A or 170B--

Column 18, Line 10 "riot" should be --not--

Signed and Sealed this

Twenty-ninth Day of April, 2008

JON W. DUDAS
*Director of the United States Patent and Trademark Office*